(12) United States Patent  (10) Patent No.: US 7,702,928 B2
Schumacher et al.  (45) Date of Patent: Apr. 20, 2010

(54) MEMORY MODULE WITH ON-BOARD POWER-CONSUMPTION MONITORING

(75) Inventors: Derek Steven Schumacher, Auburn, CA (US); Idis Ramona Martinez, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1119 days.

(21) Appl. No.: 11/102,220

(22) Filed: Apr. 8, 2005

(65) Prior Publication Data

US 2006/0230295 A1  Oct. 12, 2006

(51) Int. Cl.
*G06F 1/00* (2006.01)
*G06F 11/30* (2006.01)

(52) U.S. Cl. .................. 713/300; 713/340; 365/226; 365/227; 365/229

(58) Field of Classification Search .................. 713/300, 713/340; 365/226, 227, 229
See application file for complete search history.

(56) References Cited

U.S. PATENT DOCUMENTS

| 5,532,945 | A  | * | 7/1996  | Robinson ............... 713/321 |
| 6,269,401 | B1 | * | 7/2001  | Fletcher et al. ............ 709/224 |
| 6,944,084 | B2 | * | 9/2005  | Wilcox ...................... 365/226 |
| 7,168,853 | B2 | * | 1/2007  | Ainspan et al. ............ 374/170 |
| 7,254,075 | B2 | * | 8/2007  | Woo et al. .................... 365/207 |
| 7,304,905 | B2 | * | 12/2007 | Hsu et al. .................... 365/212 |
| 7,404,071 | B2 | * | 7/2008  | Janzen et al. .................. 713/1 |
| 2004/0034749 | A1 |  | 2/2004 | Jeddeloh |
| 2005/0283635 | A1 | * | 12/2005 | Benson et al. ................ 714/1 |

* cited by examiner

*Primary Examiner*—Thomas Lee
*Assistant Examiner*—Michael J Brown

(57) ABSTRACT

A memory module includes memory devices and a power tracker for monitoring power consumption by the memory devices. The power tracker generates digital power consumption data that can be stored and used to anticipate and/or diagnose of power-related problems. The invention allows accurate monitoring of conditions that could otherwise lead to failure and provides a source of diagnostic data in the event of system failure related to excessive power consumption. Modules that self-monitor power consumption can provide highly accurate data to the user and/or the system, which has significant advantages over error-prone theoretical measurements or estimations.

8 Claims, 2 Drawing Sheets

MEMORY MODULE WITH ON-BOARD POWER-CONSUMPTION MONITORING

BACKGROUND OF THE INVENTION

The present invention relates to computers and, more particularly, to memory subsystems for computers. In this specification, related art labeled "prior art" is admitted prior art; related art not labeled "prior art" is not admitted prior art.

SUMMARY OF THE INVENTION

The present invention as defined in the claims provides for 10 tracking power consumption by memory modules. For example, a memory module within a computer system (such as a server) can actively monitor its own power consumption. The memory module can then report or maintain power-consumption data that may be accessed as needed by the computer system itself. "Module" herein refers to a device, such as a PCI card, a DIMM, flash card, or USB flash drive, that can be inserted and removed from a computer. "Memory module" refers to modules that include memory, even though other functions are also provided.

The invention allows accurate monitoring of conditions that could otherwise lead to failure and provides a source of diagnostic data in the event of system failure related to excessive power consumption. Modules that self-monitor power consumption can provide highly accurate data to the user and/or the system, which has significant advantages over error-prone theoretical measurements or estimations. These and other features and advantages of the invention are apparent from the description below with reference to the following drawings.

DETAILED DESCRIPTION

Figure 1:
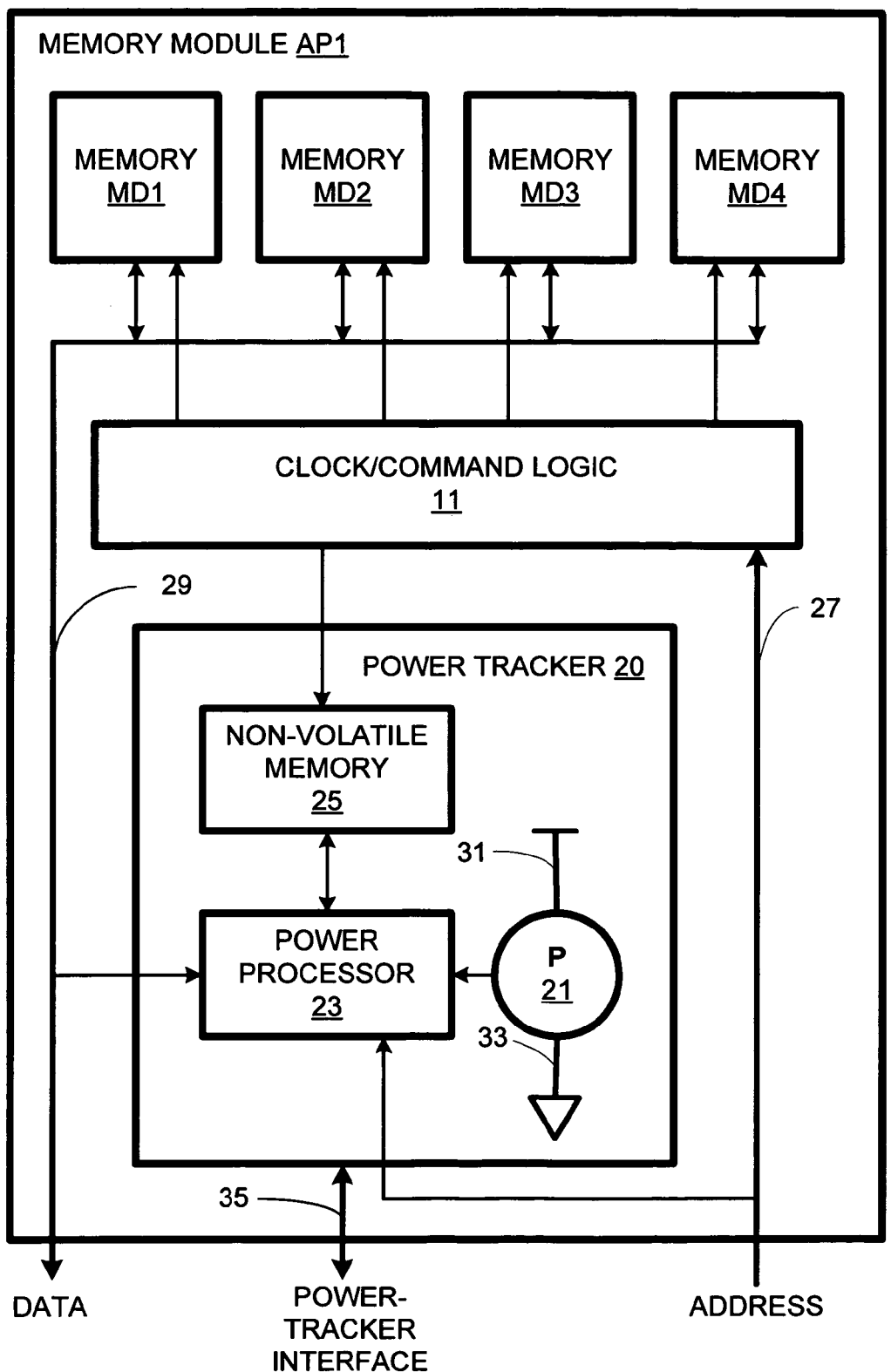
FIG. 1 is a schematic diagram of one of many memory modules within the scope of the invention.

A memory module AP1 in accordance with the present invention includes four memory devices MD1-MD4, a clock/command logic 11, and a power tracker 20. Power tracker 20 includes a power sensor 21, a power processor 23, and non-volatile memory 25. For illustrative purposes, memory module API is shown having four memory devices MD1-MD4, but eight or more would be more typical, either in a single-in-line memory module (SIMM) configuration or a dual-inline-memory module (DIMM) configuration.

Memory accesses are received along an address/command bus 27, and data is transferred along a data bus 29. Power 31 and ground 33 are shown input to power sensor, but are distributed as known in the art to all components of memory module AP1. Power sensor 21 provides digital power monitor data to power processor 23. Power processor 23 monitors data bus 29 and address/command bus 27 to gather accompanying data about the operating conditions (e.g. access mode, frequency and tiling pattern) present during a power measurement. Power processor 23 time stamps and stores that data in non-volatile memory 11.

In response to an external request, power processor 23 can transmit accumulated digital power monitor data along a dedicated power-tracker bus 35 to external devices, e.g., for use by power-tracking software. In an alternative embodiment, power-monitor data is transmitted along the common data bus. The dedicated bus approach is favored as it facilitates obtaining the power-monitor data while system power is down and only standby power is available.

Power tracker 20 is an application-specific integrated circuit (ASIC). Alternative embodiments employ a field-programmable array (FPGA), a discrete power sensor, and may not include non-volatile memory. Power tracker 20 is isolated from the rest of the memory subsystem (external to memory module AP1) for measuring the power consumption on the memory module itself, exclusive of any power consumption in the rest of the memory subsystem.

Since components from the various memory suppliers within the industry differ in their power consumption even under common operating modes and frequencies, this isolation would be necessary to ensure accurate reporting of an individual module's power draw. Power consumption can be calculated real time under the system's operating conditions (e.g. access mode, frequency and tiling pattern). Each installed module can provide a single output (per voltage rail to be monitored, as determined by the memory technology being supported on the DIMM) to the computer system that can be routed at the system designer's discretion and can be used to determine the module's power consumption.

A user or maintenance program running on the incorporating system can access the power monitor data in nonvolatile memory 25. This data can be monitored to detect problematic conditions. In addition, the maintenance program can create a power history and store it on hard disk or other non-volatile storage.

Figure 2:
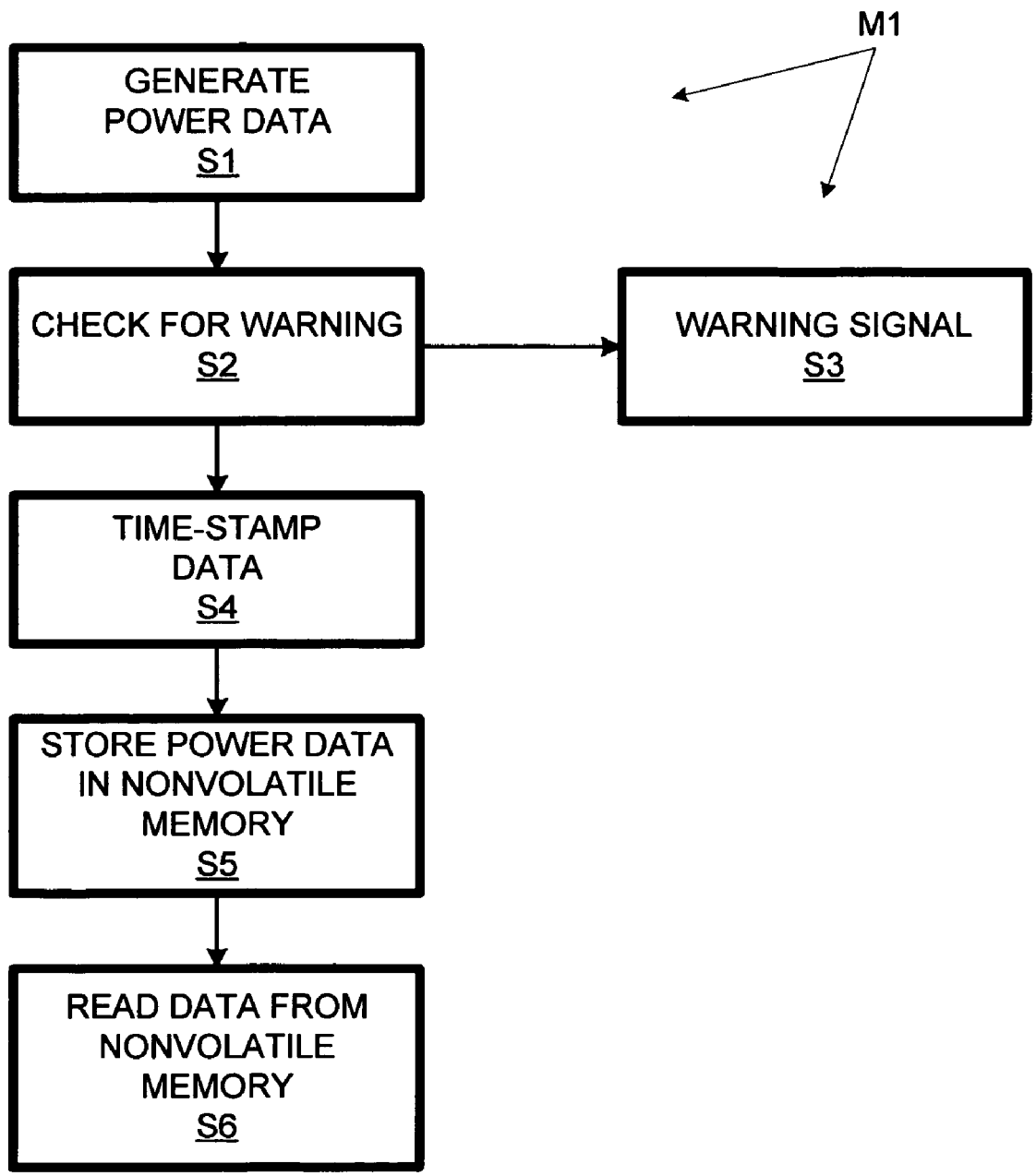
FIG. 2 is a flow chart of one of many methods within the scope of the invention.

A method M1 of the invention is flow charted in FIG. 2. While method M1 is tailored to memory module AP1, it can be applied to other memory modules in accordance with the invention. On the other hand, the invention provides for other methods that can be applied to such memory modules.

At method segment S1, power sensor 21 generates a digital signal corresponding to the power consumption determined by monitoring power and ground lines 31 and 33. In module AP1, this involves generating an analog signal corresponding to the power and then converting the analog signal to digital.

At method segment S2, power processor 23 compares the power consumption data to a warning threshold. If the threshold is exceeded, power processor issues a warning at method segment S3, e.g., along a dedicated power tracker interface bus 35. Alternatively, a warning flag can be set in non-volatile memory 25. Whether or not a warning is issued, method M1 proceeds to method segment S4.

At method segment S4, power processor 23 time stamps the power consumption data (adds data indicating the time associated with the power consumption). In addition, data, such as the current memory access mode, can be associated with the power consumption data.

At method segment S5, power processor 23 stores the stamped power consumption data in non-volatile memory 25. At method segment S6, the incorporating system reads the power monitor data from non-volatile memory 25. The illustrated method allows the transfer to memory devices to occur at an advantageous time, e.g., when the memory devices are not excessively busy with requests from the incorporating system. Also, in the event of a power failure, the most recent power data can be preserved in the non-volatile memory.

Optionally, data from non-volatile memory 25 can be transferred to memory devices MD1-MD4 to take advantage of greater memory capacity for storing power history data. However, in practice, frequent polling of non-volatile memory 25 can allow a history to be accumulated on an even more capacious hard disk.

The present invention provides for different numbers of memory devices, different types of memory devices, and different form factors (DIMM, SIMM, flash card). In addition, the invention provides for managing power consumption in a variety of ways. These and other modification to and variations upon the illustrated embodiment are provided for by the present invention, the scope of which is defined by the following claims.

What is claimed is:

1. A memory module including:
   volatile memory devices;
   a power sensor for measuring power consumption and for generating power-consumption data corresponding to the power consumed by said memory devices; and
   non-volatile memory for storing said power-consumption data.

2. A memory module as recited in claim 1 further comprising a power processor for associating contemporaneous data with said power-consumption data when said power-consumption data is stored in said non-volatile memory.

3. A memory module as recited in claim 2 further comprising a power-tracker bus, said power processor transferring said power-consumption data from said non-volatile memory to external devices via said power-tracker bus.

4. A memory module as recited in claim 2 wherein said power processor transfers said power-consumption data from said non-volatile memory to said memory devices.

5. A method comprising:
   measuring power consumed by volatile memory devices on a memory module;
   generating power-consumption data corresponding to power consumed by said memory devices on said memory module; and
   storing said power-consumption data in non-volatile memory on said memory module.

6. A method as recited in claim 5 further comprising time-stamping said power-consumption data before said storing.

7. A method as recited in claim 5 further comprising transferring said power-consumption data off said memory module in response to a request therefore.

8. A method as recited in claim 7 wherein said power-consumption data is transferred off said memory module via a dedicated power-tracker bus.

* * * * *